(12) United States Patent
Goetz et al.

(10) Patent No.: US 7,579,709 B2
(45) Date of Patent: Aug. 25, 2009

(54) MOTOR VEHICLE WITH A CAPACITOR DEVICE FOR STORING ELECTRIC ENERGY

(75) Inventors: Georg Goetz, Steinkirchen (DE); Hans Glonner, Pfaffenhofen (DE); Marcel Fenkart, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 458 days.

(21) Appl. No.: 11/599,428

(22) Filed: Nov. 15, 2006

(65) Prior Publication Data
US 2007/0114077 A1 May 24, 2007

(30) Foreign Application Priority Data
Nov. 18, 2005 (DE) .................. 10 2005 055 075

(51) Int. Cl.
*B60L 3/04* (2006.01)
(52) U.S. Cl. ..................... 307/10.1; 320/167
(58) Field of Classification Search ............. 307/10.1, 307/45, 46, 48; 320/166, 167
See application file for complete search history.

(56) References Cited

U.S. PATENT DOCUMENTS

| 5,073,751 | A | 12/1991 | Kaitabdjian et al. |
| 5,619,107 | A * | 4/1997 | Shinohara et al. ........... 318/139 |
| 7,196,492 | B2 * | 3/2007 | Sugiura et al. .............. 320/101 |
| 7,268,521 | B1 * | 9/2007 | Prakash et al. .............. 320/166 |
| 7,378,808 | B2 * | 5/2008 | Kuras et al. ................. 318/139 |

FOREIGN PATENT DOCUMENTS

| DE | 689 07 995 T2 | 2/1994 |
| DE | 103 04 557 A1 | 8/2004 |
| JP | 2004 282823 A | 10/2004 |

OTHER PUBLICATIONS

German Search Report dated May 11, 2006 Nine (9) pages including translation.

* cited by examiner

*Primary Examiner*—Albert W Paladini
(74) *Attorney, Agent, or Firm*—Crowell & Moring LLP

(57) ABSTRACT

A motor vehicle is provided with a capacitor device for storing electric energy. The capacitor device is specifically discharged by a short-circuiting switch, which is arranged in parallel to the terminal posts of the capacitor device, without any intermediary activity of a separate discharge resistor.

13 Claims, 1 Drawing Sheet

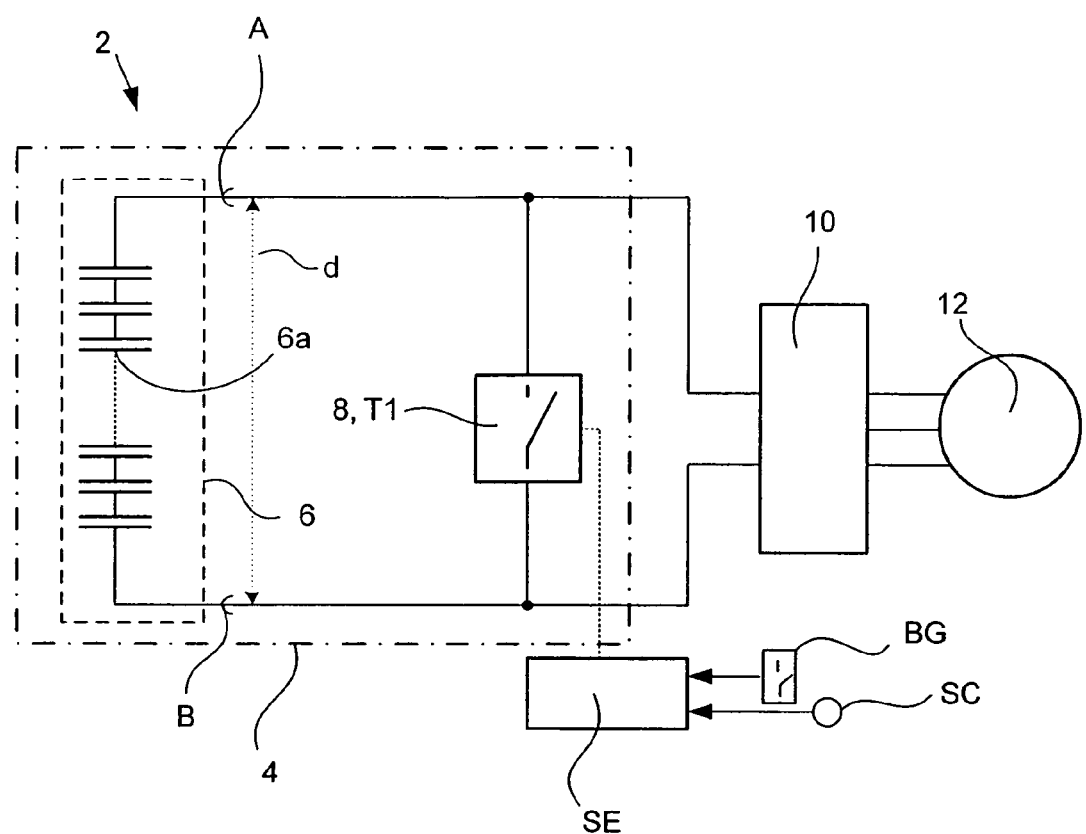

MOTOR VEHICLE WITH A CAPACITOR DEVICE FOR STORING ELECTRIC ENERGY

BACKGROUND AND SUMMARY OF THE INVENTION

This application claims the priority of German Application No. 10 2005 055 075.4, filed Nov. 18, 2005, the disclosure of which is expressly incorporated by reference herein.

The invention relates to a motor vehicle with a capacitor device for feeding electric energy and, in particular, for feeding an electric drive machine of the motor vehicle.

Such vehicles already exist in a variety of many different models. For example, double layer capacitors (also called supercaps or high power capacitors) are used as energy accumulators in so-called hybrid vehicles, in which the drive torque is supplied either via an internal combustion engine and/or via an electric machine. In order to be able to work safely on these vehicles in the specialized repair workshop, the double layer capacitor has to be discharged beforehand with a special discharge device, until an existing residual voltage permanently falls below the value of a low voltage protective limit. Such discharge devices are connected externally to the double layer capacitor. In so doing, the double layer capacitor is specifically short-circuited via a discharge resistor; and the released energy is converted into heat via the discharge resistor (see JP-A 2004-282823).

The present invention is based on the problem of providing a motor vehicle with a capacitor device, in which a safe discharge process of the capacitor device is improved.

The invention solves this problem by providing a motor vehicle with a capacitor device for storing electric energy, and in particular for feeding an electric drive machine of the motor vehicle, wherein a short-circuiting switch is arranged in parallel to the terminal posts of the capacitor device, whereby the capacitor device may be discharged by actuating the short-circuiting switch without the intermediary activity of a separate discharge resistor. Preferred further developments of the invention are described and claimed herein.

The invention provides a controllable short-circuiting switch, by which the capacitor device may be short-circuited and discharged without the intermediary activity of an additional discharge resistor. This is possible with the use of a short-circuit-proof capacitor device, which may be short-circuited via a controllable short-circuiting switch. The resulting thermal energy is dissipated and/or destroyed by way of the intrinsic mass of the capacitor device. In a preferred design, the capacitor device is disposed in the side door sill or in the cardan tunnel (tunnel-like body structure on the floor side of the vehicle, in which the cardan shaft runs) of the body of the vehicle, and is functionally connected to the automotive body sheet metal in a heat conductive manner for the purpose of dissipating the heat in the event of a short-circuit.

The controllable short-circuiting switch may be constructed as a crash sensor switch and/or as an electronic switch, which can be actuated via a controller.

A short-circuiting switch, which is designed as a crash sensor switch, is constructed, for example, as a mechanical switch, which is actuated directly by way of a deformation of the side door sill. As an alternative, the crash sensor switch may also be constructed as an electronic switch, which is actuated via a controller, which processes crash sensor signals, or is actuated directly by means of separate crash sensors. As an alternative or in addition, the short-circuiting switch may also be constructed as an electronic switch, which can be actuated by means of an operator. To this end, the electronic switch can be actuated by a controller as a function of the operator's commands—for example, by way of an external diagnostic device, which can also be connected to the electric system of the vehicle by way of a diagnostic interface for the purpose of service work. It is also contemplated to control the electronic switch specifically by an operator via an additional switching element in the interior of the vehicle.

The capacitor device is disposed preferably in a side door sill or in the cardan tunnel of the body of the vehicle. The capacitor device is connected advantageously in a heat conductive manner to the parts of the body of the vehicle, in particular to the parts of the side door sill, or preferably to the parts of the cardan tunnel, respectively.

In an especially preferred design, the capacitor device consists of a plurality of capacitor cells, whereby the capacitor cells are wired together in series and are configured in the shape of the narrowest possible arch inside the side door sill or inside the cardan tunnel such that the terminal posts, which are to be short-circuited, exhibit the smallest possible spacing in relation to each other. In this way, unnecessarily long line connections (which carry a high current loading in the event of a short-circuit) may be avoided.

In the event of an accident, but also in the event that maintenance work is to be done on the vehicle, the inventive device makes it possible to switch the capacitor device in the vehicle to neutral with respect to the high voltages of the capacitor device within a few seconds. Complicated and protracted discharging processes, which are necessary in the conventional external discharge devices via separate discharge resistors, are not necessary. Furthermore, safety is significantly increased because the discharge device is now located inside the vehicle (or rather inside an integrated capacitor module) and, even in the event of an accident, can be activated and/or short-circuited, so that the vehicle may be switched free of high voltage in seconds. Another advantage may be seen in the fact that separate cooling devices for dissipating the thermal energy in the event of a short-circuit are not necessary.

Other objects, advantages and novel features of the present invention will become apparent from the following detailed description of the invention when considered in conjunction with the accompanying drawings.

BRIEF DESCRIPTION OF THE DRAWING

The FIGURE is a schematic block diagram of one embodiment of the invention.

DETAILED DESCRIPTION OF THE DRAWING

The FIGURE shows a capacitor module 2 with a housing 4, which contains a capacitor device 6, including a plurality of capacitor cells 6a, and a short-circuiting switch 8, T1, which is connected in parallel to the capacitor device 6. The housing 4 is constructed, preferably, in such a manner that if the capacitor unit 6 unfolds maximum explosive power in the event of a fault, the housing 4 remains in essence undamaged. The capacitor cells 6a are connected in series one after the other and are configured in a preferred embodiment as a loop in a side door sill of a motor vehicle. This configuration is carried out such manner that the terminal posts A, B of the capacitor device 6 have the smallest possible spacing d in relation to each other. This is achieved in that the capacitor cells 6a that form the terminal posts A, B (therefore, the first and the last capacitor cell 6a) are arranged with their free terminal ends directly adjacent to each other in the side door sill.

In the illustrated embodiment, the short-circuiting switch 8 is constructed as an electronic switch T1 (semiconductor switch or the like, e.g., thyristor). The short-circuiting switch 8 may be actuated via a controller SE as a function of the control signals. The control signals may be generated automatically, for example, by way of the crash sensors SC or may be generated specifically by a user on the basis of operating devices BG, such as the diagnostic devices or the operating switches in the interior of the vehicle. In other embodiments, the short-circuiting switch 8 may be constructed, as an alternative or in addition, as a purely mechanical switch, which is activated on the basis of a deformation in the area of the side door sill (crash sensor switch).

The two terminal posts A, B of the capacitor module 2 are coupled to an electric machine 12 by way of an inverter module 10. In so doing, the current and the voltage are matched as a function of the operating mode of the electric machine 12 (by means of a generator or by means of a motor).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having an electric drive machine, the motor vehicle comprising:
   a capacitor device for storing electric energy feedable to the electric drive machine of the motor vehicle;
   a short-circuiting switch coupled in parallel with terminal posts of the capacitor device; and
   wherein the capacitor device is dischargeable by actuating the short-circuiting switch without any intermediary activity via a separate discharge resistor.

2. The motor vehicle according to claim 1, wherein the short-circuiting switch is an electronic switch; and
   a controller for actuating the electronic switch.

3. The motor vehicle according to claim 1, further comprising a side door sill and a cardan tunnel formed in the vehicle, wherein the capacitor device is disposed in the side door sill or the cardan tunnel.

4. The motor vehicle according to claim 1, wherein the capacitor device is coupled in a heat conductive manner to body parts of a vehicle body for dissipating thermal energy.

5. The motor vehicle according to claim 3, wherein the capacitor device is coupled in a heat conductive manner to either the side door sill or the cardan tunnel for dissipating thermal energy.

6. The motor vehicle according to claim 1, wherein the capacitor device comprises a plurality of capacitor cells, said capacitor cells being wired together in series and disposed inside a side door sill or a cardan tunnel of the vehicle such that terminal posts that are short-circuited via the short-circuiting switch have a minimal spacing in relation to one another.

7. The motor vehicle according to claim 3, wherein the short-circuiting switch is a mechanical switch which detects deformation of the vehicle body in an area of the side door sill, wherein if deformation is detected, the mechanical switch causes a short-circuiting of the capacitor device.

8. The motor vehicle according to claim 4, wherein the short-circuiting switch is a mechanical switch which detects deformation of the vehicle body in an area of the side door sill, wherein if deformation is detected, the mechanical switch causes a short-circuiting of the capacitor device.

9. The motor vehicle according to claim 6, wherein the short-circuiting switch is a mechanical switch which detects deformation of the vehicle body in an area of the side door sill, wherein if deformation is detected, the mechanical switch causes a short-circuiting of the capacitor device.

10. The motor vehicle according to claim 1, further comprising a housing in which the capacitor device and the short-circuiting switch are arranged.

11. A capacitor system for feeding electric energy to an electric drive machine of a motor vehicle, the capacitor system comprising:
    a capacitor device for storing the electric energy; and
    a short-circuiting switch arranged in parallel to terminal posts of the capacitor device, wherein actuation of the short-circuiting switch discharges the capacitor device without any intermediary activity of a separate discharge resistor.

12. The capacitor system according to claim 11, wherein the short-circuiting switch is an electronic switch controllable via a controller.

13. The capacitor system according to claim 11, wherein the short-circuiting switch is a mechanical switch for detecting deformation of a body of the vehicle, said deformation causing the short-circuiting of the capacitor device.

* * * * *